(12) United States Patent
Olson

(10) Patent No.: US 6,408,843 B1
(45) Date of Patent: Jun. 25, 2002

(54) PORTABLE GROUND THAWING APPARATUS

(75) Inventor: Lawrence Bernard Olson, Princeton, MN (US)

(73) Assignee: Ground Specialties, Inc., Milaca, MN (US)

( * ) Notice: Subject to any disclaimer, the term of this patent is extended or adjusted under 35 U.S.C. 154(b) by 0 days.

(21) Appl. No.: 09/517,767

(22) Filed: Mar. 3, 2000

Related U.S. Application Data

(60) Provisional application No. 60/123,003, filed on Mar. 5, 1999.

(51) Int. Cl.⁷ ................................................. F23C 5/00
(52) U.S. Cl. ............................ 126/271.2 R; 126/271.1; 126/271.2 A; 37/228
(58) Field of Search ......................... 126/92 B, 85 A, 126/92 R, 85 R, 271.1, 271.2 R, 271.2 A, 271.2 B; 37/227, 228, 230; 431/107, 109

(56) References Cited

U.S. PATENT DOCUMENTS

| | | | |
|---|---|---|---|
| 982,271 A | * | 1/1911 | Hartel |
| 1,043,464 A | * | 11/1912 | Roesller et al. |
| 1,049,769 A | * | 1/1913 | Rubin |
| 1,089,440 A | * | 3/1914 | Risinger |
| 1,188,038 A | * | 6/1916 | Campbell |
| 1,196,019 A | * | 8/1916 | Palmer |
| 1,222,627 A | * | 4/1917 | Humphrey |
| 3,223,079 A | * | 12/1965 | Keusder ............ 126/271.2 A |
| 3,279,458 A | * | 10/1966 | Moench ............ 126/271.2 A |
| 3,311,104 A | * | 3/1967 | Wollner et al. ........... 126/92 B |
| 4,349,010 A | | 9/1982 | Bentham ............... 126/271.1 |
| 5,033,452 A | | 7/1991 | Carriere ................ 126/271.1 |
| 5,441,038 A | | 8/1995 | Ohmann ................ 126/271.1 |
| 6,012,444 A | * | 1/2000 | Skender ................ 126/92 B |

FOREIGN PATENT DOCUMENTS

| | | | | |
|---|---|---|---|---|
| AU | 107644 | * | 12/1938 | ............... 126/92 B |
| DE | 2207267 | * | 8/1972 | .......... 126/271.2 R |
| DE | 26 39 195 | * | 3/1978 | ............... 126/92 B |
| DE | 3415056 | * | 10/1985 | .......... 126/271.2 R |
| FR | 2394021 | * | 2/1979 | .......... 126/271.2 R |
| GB | 917976 | * | 2/1963 | ............... 126/92 B |
| GB | 1029774 | * | 5/1966 | ............... 126/92 B |
| JP | 6-341646 | * | 12/1994 | ............... 126/92 B |

* cited by examiner

*Primary Examiner*—Carl D. Price
(74) *Attorney, Agent, or Firm*—Curtis Harr

(57) ABSTRACT

The invention is a portable ground thawing device using a shallow rectangularly shaped box-like apparatus (or thaw body) that is open-ended on the side that would normally form the floor of the thaw body. This open-ended box is constructed with a high degree of insulating value and is designed to trap heat against the surface of frozen ground while also including a reflective inner surface. The heating requirements are supplied by the use of an externally mounted radiant propane heater that is commonly available in the marketplace today. This attachment is built into one of the short vertical walls on the end of the thaw body by placing the burner element of the radiant heater in the most outward opening of a vented heat transfer tube. The vented heat transfer tube is a cylindrical opening that passes from the outside of the thaw body so as to leave an air gap to allow for the free flow of air from inside the thaw body to the outside by the burner. This free flow of air to the heater enhances the efficiency of the radiant heater and therefore increases the operational effectiveness of the invention.

18 Claims, 4 Drawing Sheets

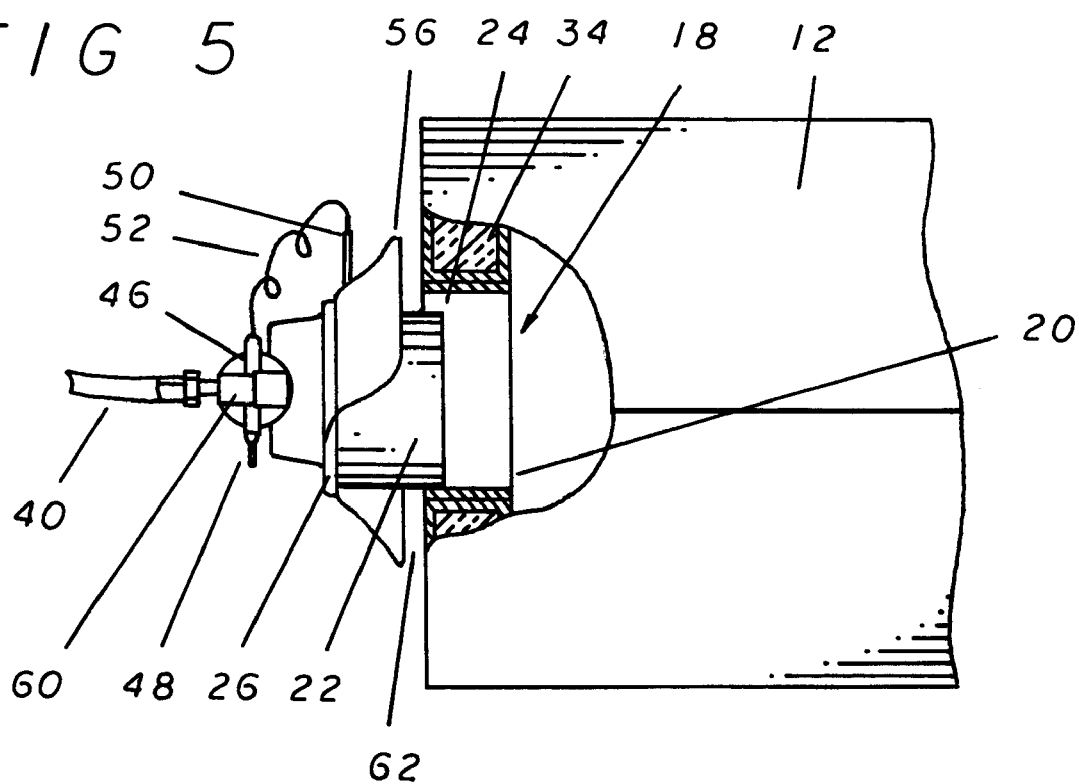
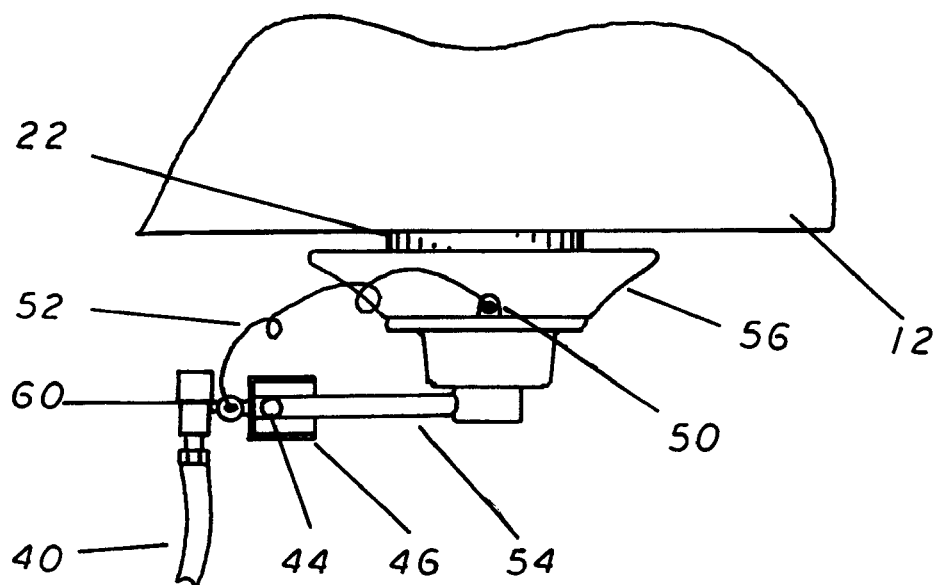

PORTABLE GROUND THAWING APPARATUS

This application claims the benefit of U.S. Provisional application No. 60/123,003 filed Mar. 5, 1999.

BACKGROUND OF THE INVENTION

The present invention relates to an improvement in a ground heater and more particularly to a portable apparatus used to defrost a small portion of frozen ground to a certain depth for ease in excavation.

In cold climates the ground can often be frozen to a depth of three feet or more. This frozen ground can be extremely difficult to excavate, as the moisture in the soil freezes producing a barrier similar to concrete. It is often necessary to place utility lines such as gas, water or electricity several feet below the surface of the earth. In order to service these lines it is necessary to excavate. The frozen ground can make this excavation similar to digging through cement. Heavy equipment is available to perform this task, but such can be extremely dangerous near gas or other lines making it necessary to dig manually. Several devices are known which may be used to thaw a small section of ground prior to excavation. These devices defrost and thereby soften the ground aiding so that the manual excavation of dirt may be possible.

U.S. Pat. No. 5,441,038 issued to Ohmann discloses a ground thaw device using a chamber with sidewalls and a roof made of an insulating material. The chamber has a port that is substantially airtight to the outside and made to receive a burner. As the port is substantially closed, large amounts of heat can build in this area creating problems. The device may also be fitted with a fan which may be used to dissipate this heat, adding to the complexity of this device.

U.S. Pat. No. 5,033,452 issued to Carriere also discloses a thawing device with a thermally insulated housing. This device uses a burner mounted inside a fire tube. The housing in this device uses a pitched roof with a steam vent at its apex. This vent allows for the escape of steam and thus, heat. It has been found that steam may greatly aid in thawing the ground as it penetrates and softens the earth.

U.S. Pat. No. 4,349,010 issued to Bentham generally discloses a frost removal system which uses a series of heating pipes. These pipes are placed on the ground for thawing.

As can be seen from this discussion it would be desirable to have a highly portable device for thawing a portion of earth and order to allow for its excavation. This device should be light enough to allow a single person without assistance to transport setup and use. This device should be able to run for extended periods of time on small amounts of gas and be safe to operate.

SUMMARY OF THE INVENTION

It is the primary objective of the present invention to provide a method by which a defined area of ground can be thawed to a depth of three feet during the cold winter months which will allow individuals to evacuate soil from previously hard frozen earth to gain access to buried cables, water lines, gas lines, or other similar utilities that are commonly placed below the surface of the earth. It should be stated at this point that this device should be useful for defrosting a small portion of ground any time as necessary to aid in its excavation. Further the user may incorporate more than one device at a time if necessary to thaw a larger area.

It is an additional objective of the present invention to provide such a method of thawing frozen earth that does not require the use of a great deal of heating fuel and therefore operates in an efficient manner.

It is a further objective of the present invention to provide such a method of thawing frozen earth that is extremely portable and is designed and constructed in a manner that allows a single person to easily and effectively to both operate the device and transport it from place to place.

These objectives are accomplished by the use of a shallow rectangularly shaped box-like apparatus (or thaw body) that is open-ended on the side that would normally form the floor of the thaw body. This open-ended box is constructed with a high degree of insulating value and is designed to trap heat against the surface of frozen ground. The insulating qualities of the thaw body are accomplished by building the walls of the box in a double-walled fashion. This means that all the walls will have both an inner and outer wall which leaves an open space between them. This space may then filled with a commonly available insulation material such as fiberglass or foam insulation. This method of construction ensures that the interior of the thaw body retains the maximum amount of any heat that is directed into it and enables the present invention to operate in the most efficient manner possible while being employed to thaw frozen ground during the winter months.

The heating requirements of the present invention are supplied by the use of an externally mounted radiant propane heater that is commonly available in the marketplace today. One such heater is sold under the name MR. HEATER or commonly referred to as sunflower heads. This attachment is built into one of the short vertical walls on the end of the thaw body by placing the burner element of the radiant heater in the most outward opening of the vented heat transfer tube. The vented heat transfer tube is a cylindrical opening that passes from the outside of the thaw body to the inner body cavity and which is made up of an inner and outer tube. The outer tube is a cylindrical opening of the thaw body wall while the inner tube is a separate and relatively short section of a tube that is somewhat smaller in its outside diameter than the inside diameter of the outer tube. Additionally, the inner tube is permanently attached to the most outer end of the outer tube and extends outward therefrom in a manner so that it extends beyond the outer wall of the thaw body. The attachment of the inner tube to the outer tube is also made in such a manner so that its orientation is offset with respect to the position of the outer tube. This offset of the inner tube is critical to the spirit of the invention as it leaves a gap between the inner and outer tubes that allows for the free flow of air to the radiant heater. This free flow of air to the heater enhances the efficiency of the radiant heater and therefore increases the operational effectiveness of the invention.

Once the radiant heat is channeled into the thaw body of the present invention, it encounters the reflector shield that is attached to the upper inside surface of the thaw cavity. The reflector shield is a reflective plate attached to the thaw cavity by the use of a plurality of bolts and wing-nuts. The reflector shield serves the purpose of directing the heat generated by the radiant heater in a downward manner which forces it to encounter the earth. Further, all inner surfaces of the thaw body may be coated with a reflective surface to reflect the radiant heat toward the ground. Thus, this design transfers the heat generated by the radiant heater into the internal cavity of the thaw body and then directs it in a downward manner where it contacts and effectively thaws frozen ground.

For a better understanding of the present invention, reference should be made to the drawings and the description in which there are illustrated and described preferred embodiments of the present invention.

DESCRIPTION OF THE DRAWINGS

FIG. 5 is a close-up and cross-sectional view of the radiant heater component of the present invention which details the manner of construction of the heat transfer tube and its orientation to the radiant heater.

FIG. 6 is a close-up top elevation view of the radiant heater component of the present invention and further details its major parts and the manner in which they interact with the body of the invention.

DESCRIPTION OF THE PREFERRED EMBODIMENT

Figure 1:
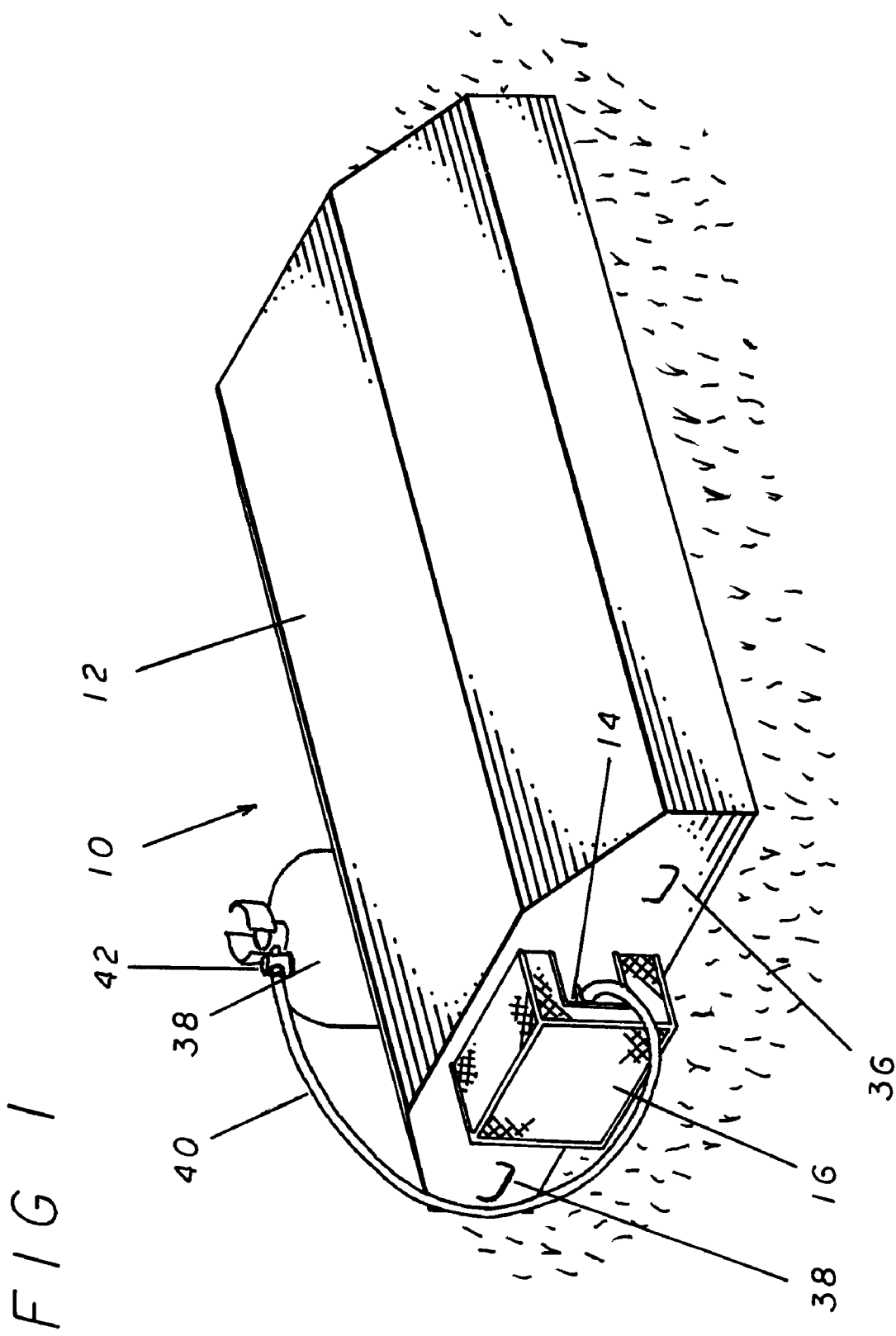
FIG. 1 is a perspective view of the present invention illustrating its general design characteristics and the orientation of its major components in relation to one another and the body of the invention.
Figure 2:
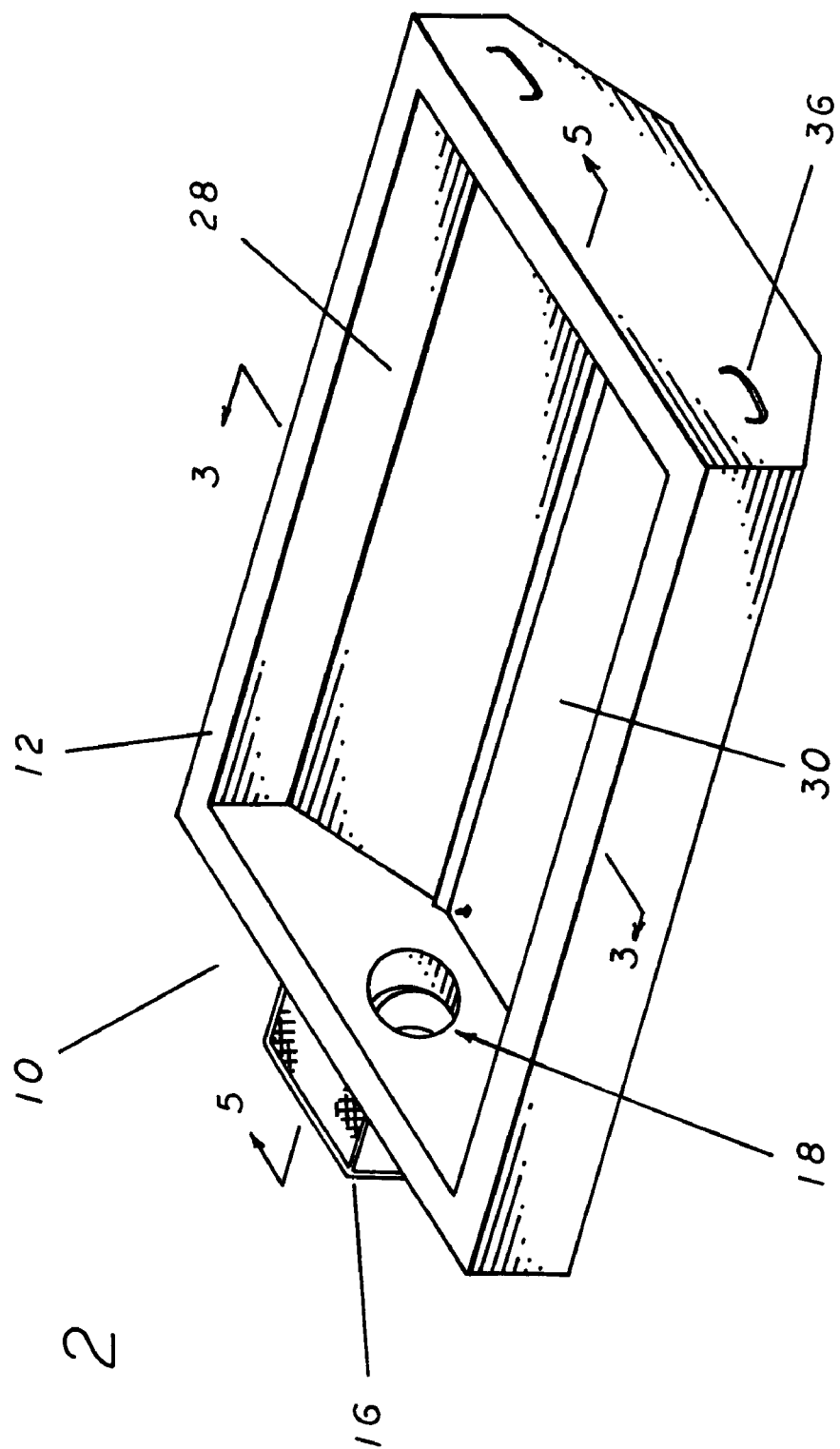
FIG. 2 is also a perspective view of the present invention as shown in FIG. 1 and illustrates the configuration of the underside of the body of the invention.

Referring now to the drawings, and more specifically to FIGS. 1 and 2, the portable ground thawing apparatus 10 is primarily made up of the radiant heater 14 and the thaw body 12. The thaw body 12 is a generally shallow rectangularly shaped box-like apparatus that is open-ended on the side that would otherwise form the floor of the thaw body 12. Additionally, the thaw body 12 contains a plurality of body handles 36 which are attached in convenient locations on the outer surfaces of the thaw body 12 which allow the invention to be easily lifted and carried during its use. This enables the present invention to be easily moved from place to place which greatly expands its thawing capabilities.

The thawing function of the invention is enhanced by its method of construction by which the walls are built in a double walled configuration which creates an open space between them. This space is then filled with an insulating material such as fiberglass or closed cell foam which greatly increases the thaw body's 12 ability to retain heat. This method of construction ensures that the interior of the thaw body 12 retains the maximum amount of any heat that is directed into it enabling the present invention to operate in the most efficient manner, while also keeping the external temperature at a safe level to prevent burns to the user.

The heating requirements of the present invention are supplied by the use of an externally mounted radiant propane heater 14 that is commonly available in the marketplace today. This attachment is made in one of the end short vertical walls of the thaw body 12 by placing the radiant heater 14 in the most outward opening of the vented heat transfer tube 18. The vented heat transfer tube 18 is essentially a cylindrical opening that passes from the outside of the thaw body 12 to the inner body cavity 28. On the exterior of the present invention, the radiant heater 14 is covered with the heater cage 16 which keeps things such things as human hands and flammable materials from coming into contact with the high heat generated by the radiant heater 14 thereby lessening the risk of serious injury or the unintentional starting of fires.

Once the radiant heat is channeled into the thaw body 12 of the present invention, it encounters the reflector shield 30 that is attached to the upper inside surface of the thaw cavity 28. The reflector shield 30 is a reflective plate that is attached to the thaw cavity 28 by the use of a plurality of bolts 32 and wing-nuts and which serves the purpose of directing the heat generated by the radiant heater 14 in a downward manner which forces it into contact with the earth. Thus, the design of the present invention transfers the heat generated by the radiant heater 14 into the internal cavity 28 of the thaw body 12 and then directs it in a downward manner where it contacts and effectively thaws frozen ground.

The fuel source necessary for the radiant heater 14 is supplied by the use of a portable propane tank 38 that is commonly used in such articles as outdoor grills and other cookers and which supplies gas to the heater through the propane hose 40 which runs from the tank 38 to the back side of the heater 14. The propane hose 40 also contains the gas flow controls and other critical safety features that will be more fully discussed in conjunction with other features of the present invention below. Additionally, the propane hose is also commonly fitted with a excess flow restrictor valve 42 which, in the event that there is an uncontrolled free flow of gas within the propane hose 40, will shut off the flow of gas from the propane tank 38 to the heater 14 thereby avoiding any potential hazards created from the accumulation of unburned gas.

Figure 3:
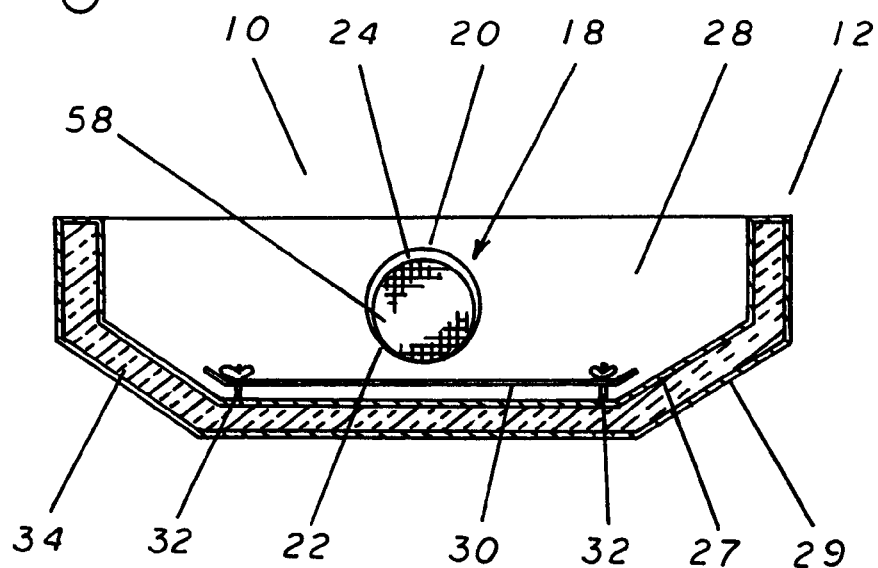
FIG. 3 is a front elevation cross-sectional view of the present invention with the cross-section being taken along the line 3—3 of FIG. 2 and which details the construction of the bottom side of the invention.
Figure 4:
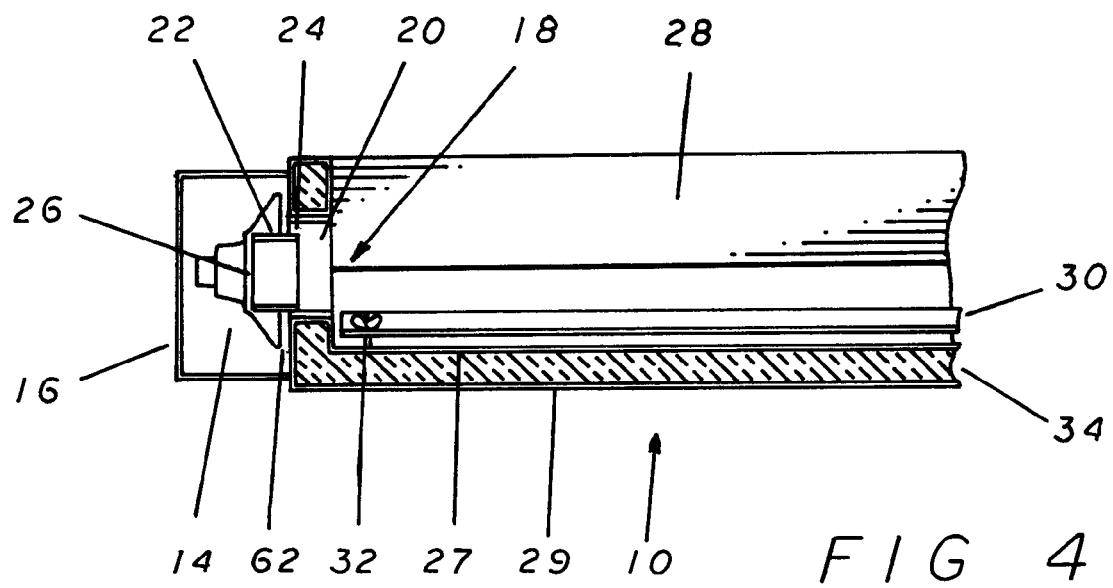
FIG. 4 is a side elevation cross-sectional view of the present invention with the cross-section being taken along line 5—5 of FIG. 2 and which illustrates the placement of the radiant heater in the body of the invention.

The manner of construction of the thaw body 12 and its outer walls is further detailed in FIGS. 3 and 4. These illustrations clearly show the manner in which the dual walls of the thaw body 12 form an interior cavity which allows for the use of the body insulation 34. As previously discussed, the use of the body insulation 34 greatly increases the thaw body's 12 ability to retain heat which increases the invention's thawing capabilities and also increases the efficiency of performing this role. The dual wall of the thaw body 12 is constructed by the use of an inside wall 27 and an outside wall 29 over the entire length of the invention's exterior. This manner of construction produces a box-like apparatus that is very proficient at retaining heat within a confined area which forms the ideal environment for the thawing of frozen earth. These drawings also further illustrate the manner in which the reflector shield 30 is attached to the thaw body 12 and its location therein.

The location and manner of construction of the vented heat transfer tube 18 is also further illustrated in these two drawings. The vented heat transfer tube 18 is made up of an outer tube 20 and an inner tube 22. The outer tube 20 is a cylindrical opening of the thaw body 12 wall that extends entirely through the wall while the inner tube 22 is a separate and relatively short section of a tube that is somewhat smaller in its outside diameter than the inside diameter of the outer tube 20 and which is permanently attached to it. The attachment of the inner tube 22 is made to the most outer end of the outer tube 20 and extends outward therefrom in a manner so that it extends beyond the outer wall of the thaw body 12. This extension of the inner tube 22 forms the base to which the radiant heater 14 is attached and this aspect will be more further discussed below.

The attachment of the inner tube 22 to the outer tube 20 is made in such a manner so that its orientation is offset with respect to the position of the outer tube 20. This offset of the inner tube 20 is critical to the spirit of the invention as it leaves a vent gap 24 between the inner and outer tubes that allows for the free flow of air to the radiant heater 14. This free flow of air to the heater enhances the efficiency of the radiant heater 14 and therefore increases the operational effectiveness of the invention.

The orientation of the vented heat transfer tube 18 within the thaw body 12 is further detailed in FIG. 3 which also illustrates the positioning of the inner tube 22 within the outer tube 20 of the heat transfer tube 18. This drawing also clearly shows the manner by which the inner tube 22 is attached on one side to the inside diameter of the outer tube 20. This method of attachment leaves a vent gap 24 around the edges of the inner tube 22 that are opposite to its point of attachment to the outer tube 20. The creation of this gap 24 is a result of the fact that the outer dimension of the inner tube 22 is smaller than the inside diameter of the outer tube 20. Additionally, the radiant heater 14 is attached to the body of the invention in a manner which creates a reflector gap 62 between the body of the heater 14 and the outer wall of the thaw body 12. This reflector gap 62 allows air to freely flow around the radiant heater 14 and so works in conjunction with the vent gap to ensure that the heater's burner 58 located within the inner tube 22 is always supplied with a sufficient amount of oxygen in the burning process.

The manner in which the radiant heater 14 is attached to the thaw body 12 is further illustrated in FIGS. 4 and 5. As previously stated, the radiant heater 14 is attached to the thaw body 12 of the present invention by the use of the extending nature of the inner tube 22 of the vented heat transfer tube 18. The most outward end of the inner tube 22 is equipped with a heater attachment flange 26 which matches exactly in dimensions and configuration to the most inner surface of the reflector 56 of the of the radiant heater 14. The attachment is made by passing a plurality of bolts though the most rearward surface of the reflector 56 and into the heater attachment flange 26. Again, the orientation of the most rearward portion of the inner tube 22 holds the heater reflector 56 in a position which leaves a reflector gap 62 between the leading edge of the reflector 56 and the outer wall of the thaw body 12 which allows for the free passage of air to the heater 14.

The basic configuration of the radiant heater 14 and a further detail of its orientation with regard to the body of the present invention is illustrated in FIGS. 5 and 6. The radiant heater 14 is commonly made up of a burner 58 which is surrounded by an outwardly expanding cone shaped reflector 58 which has the purpose of evenly dissipating the heat generated by the burner 58. Gas is delivered to the burner 58 by means of the propane hose 40, which attaches to the body of the heater 14 through the control valve 60. The control valve is the component which is used to regulate the quantity of gas being delivered to the heater 14 and is itself attached to the most outward end of the heater vent tube 54.

The most outward end of the vent tube 54 is also equipped with the thermal coupler 48 which serves to shut off the flow of gas to the burner 58 in the event that the flame goes out. The thermal coupler 48 works in conjunction with a heat sensor 50 which is embedded in the heater reflector 56 in a location so that it can constantly monitor the temperature of the burner 58 and to which it is attached by means of the heat sensor wire 52. Finally, the vent tube 54 also contains a burner vent 44 which allows air to enter the radiant heater 14 during operation to ensure the proper air/fuel mixture is achieved for proper burner 58 operation. The present invention also employs a vent wind guard 46 which is an open ended cylinder that fits over and around the vent tube 54 in a location so that it limits the amount of air that can enter the burner vent 44. This is an essential component of the present invention as it is often used in the open where it may be exposed to high winds. Without the use of the vent wind guard, 46 these high winds would be able to enter the vent tube 54 and disrupt the flow of gas to the burner 58 causing flame blow outs. The open ended nature of the vent wind guard 46 allows sufficient air to enter the burner vent 44 for normal operation but also keeps large volumes of air out and thereby avoids flame blowouts.

Although the present invention has been described in considerable detail with reference to certain preferred versions thereof, other versions are possible. Therefore, the spirit and scope of the appended claims should not be limited to the description of the preferred versions contained herein.

What is claimed is:

1. A portable ground thawing apparatus, comprising:
   a portable insulated thaw body defining an enclosed inner cavity said thaw body having a top section, side sections and an open bottom thawing section;
   a thaw body opening having a first diameter on said thaw body wherein one of said side walls defines therein said thaw body opening;
   a radiant type heater having a fuel inlet, a radiant burner and a burner control; and
   a tube section having a first and second end and a diameter less than said first diameter of said thaw body opening, said first end fixedly attached to said portable insulated thaw body such that said first end extends into said thaw body opening and defines a vent gap section for the free passage of gases between said tube section and said thaw body opening, said second end of said tube section being fixedly attached to said radiant type heater so as to completely encompass said radiant burner such that said tube section directs heat from said radiant burner into said inner cavity of said thaw body said second end and said radiant type heater being positioned outside of said thaw body.

2. A portable ground thawing apparatus as in claim 1 wherein said radiant burner is a propane burner section.

3. A portable ground thawing apparatus as in claim 2 wherein said radiant burner is circular in shape.

4. A portable ground thawing apparatus as in claim 3 further comprising a reflector shield removably attached in said inner cavity so as to substantially cover said top section while leaving an air space between said top section and said reflector shield.

5. A portable ground thawing apparatus as in claim 4 wherein said inner cavity of said thaw body and said reflector shield have a reflective surface.

6. A portable ground thawing apparatus as in claim 4 wherein said inner cavity of said thaw body and said reflector shield are coated with a reflective material.

7. A portable ground thawing apparatus as in claim 6 wherein said thaw body further comprises a shell having a outer and inner liner and a center insulating section.

8. A portable ground thawing apparatus, comprising:
   a thaw body defining an inner cavity having side walls and a top section said thaw body having an inner and an outer surface with a center insulating layer between said inner and outer surface;
   an opening having a first diameter on said thaw body defined by one of said side walls said opening having an inner surface, an outer opening defined by said outer surface of said thaw body and an inner opening defined by inner surface of said thaw body;

a radiant type heater having a fuel inlet, a radiant burner and a burner control; and a tube section having a first and second end and a diameter less than said first diameter of said opening, said first end fixedly attached to said portable insulated thaw body such that said first end extends into said thaw body opening past said outer opening and defines a vent gap section for the free passage of gases between said inner cavity and the outside said vent gap being between said tube section and said thaw body openings inner surface, said second end of said tube section being fixedly attached to said radiant type heater so as to completely encompass said radiant burner such that said tube section directs heat from said radiant burner into said inner cavity of said thaw body said second end and said radiant type heater being positioned outside of said thaw body.

9. A portable ground thawing apparatus as in claim 8 wherein said radiant burner is a propane burner section.

10. A portable ground thawing apparatus as in claim 9 wherein said radiant burner is circular in shape.

11. A portable ground thawing apparatus as in claim 10 further comprising a reflector shield removably attached in said inner cavity so as to substantially cover said top section while leaving an air space between said top section and said reflector shield.

12. A portable ground thawing apparatus as in claim 11 wherein said inner cavity of said thaw body and said reflector shield have a reflective surface.

13. A portable ground thawing apparatus as in claim 11 wherein said inner cavity of said thaw body and said reflector shield are coated with a reflective material.

14. A portable ground thawing apparatus as in claim 13 wherein said thaw body is insulated to prevent the transfer of heat from said inner surface to said outer surface.

15. A portable ground thawing apparatus, comprising:

a thaw body defining an inner cavity having side walls and a top section said thaw body having an inner and an outer surface;

a reflector shield removably attached in said inner cavity so as to substantially cover said top section while leaving an air space between said top section and said reflector shield;

an opening on said thaw body defined by one of said side walls said opening have an inner surface, an outer opening defined by said outer surface of said thaw body and an inner opening defined by inner surface of said thaw body and a first diameter;

a radiant type heater having a fuel inlet, a radiant burner, a conical reflector section and a burner control; and a tube section having a first and second end and a diameter less than said first diameter of said opening, said first end fixedly attached to said portable insulated thaw body such that said first end extends into said thaw body opening past said outer opening and defines a vent gap section for the free passage of gases between said inner cavity and the outside said vent gap being between said tube section and said thaw body openings inner surface, said second end of said tube section being fixedly attached to said radiant type heater so as to completely encompass said radiant burner such that said tube section directs heat from said radiant burner into said inner cavity of said thaw body said second end and said radiant type heater being positioned outside of said thaw body.

16. A portable ground thawing apparatus as in claim 15 wherein said radiant burner is a propane burner section.

17. A portable ground thawing apparatus as in claim 16 wherein said inner cavity of said thaw body and said reflector shield have a reflective surface.

18. A portable ground thawing apparatus as in claim 17 wherein said thaw body is insulated to prevent the transfer of heat from said inner surface to said outer surface.

\* \* \* \* \*